US009171563B1

(12) United States Patent
Biskeborn

(10) Patent No.: US 9,171,563 B1
(45) Date of Patent: Oct. 27, 2015

(54) RECORDING MEDIUM HAVING INDEPENDENT TRACK FOR VELOCITY, TIMING AND/OR LONGITUDINAL POSITION

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/503,286

(22) Filed: Sep. 30, 2014

(51) Int. Cl.
*G11B 5/584* (2006.01)

(52) U.S. Cl.
CPC ..................................... *G11B 5/584* (2013.01)

(58) Field of Classification Search
None
See application file for complete search history.

(56) References Cited

U.S. PATENT DOCUMENTS

| | | | |
|---|---|---|---|
| 5,862,014 A | 1/1999 | Nute | |
| 5,930,065 A | 7/1999 | Albrecht et al. | |
| 6,236,525 B1 * | 5/2001 | Cates et al. | 360/75 |
| 6,282,051 B1 | 8/2001 | Albrecht et al. | |
| 6,469,867 B2 | 10/2002 | Saliba | |
| 6,710,967 B2 | 3/2004 | Hennecken et al. | |
| 6,735,039 B1 * | 5/2004 | Molstad | 360/77.12 |
| 6,744,594 B2 * | 6/2004 | Denison et al. | 360/77.12 |
| 6,762,900 B2 | 7/2004 | Bui et al. | |
| 6,873,487 B2 * | 3/2005 | Molstad | 360/75 |
| 6,912,104 B2 * | 6/2005 | Trabert et al. | 360/77.12 |
| 6,918,554 B2 | 7/2005 | Stamm et al. | |
| 6,934,115 B1 * | 8/2005 | Kientz et al. | 360/77.12 |
| 6,937,413 B2 * | 8/2005 | Bui et al. | 360/77.12 |
| 7,035,040 B2 * | 4/2006 | Molstad et al. | 360/77.12 |
| 7,095,583 B2 * | 8/2006 | Johnson et al. | 360/77.12 |
| 7,106,544 B2 * | 9/2006 | Dugas et al. | 360/75 |
| 7,391,587 B2 * | 6/2008 | Dugas et al. | 360/75 |
| 7,393,066 B2 * | 7/2008 | Dugas et al. | 360/75 |
| 7,489,465 B2 | 2/2009 | Bates et al. | |
| 7,538,969 B2 * | 5/2009 | Weber et al. | 360/77.12 |
| 7,570,450 B2 | 8/2009 | Koeppe | |
| 8,233,246 B2 | 7/2012 | Koeppe | |
| 8,254,058 B2 | 8/2012 | Biskeborn | |
| 8,773,795 B1 | 7/2014 | Biskeborn | |
| 2004/0223248 A1 * | 11/2004 | Dugas et al. | 360/75 |
| 2009/0150599 A1 | 6/2009 | Bennett | |
| 2009/0213493 A1 | 8/2009 | Bui et al. | |
| 2009/0231756 A1 | 9/2009 | Koeppe | |
| 2011/0102943 A1 | 5/2011 | Biskeborn et al. | |
| 2011/0199703 A1 | 8/2011 | Hansen et al. | |

(Continued)

OTHER PUBLICATIONS

U.S. Appl. No. 13/923,280, filed Jun. 20, 2013.
U.S. Appl. No. 14/278,785, filed May 15, 2014.
Degraaf, C., "Tape Drive Technology Comparison," Spectra Logic Corporation, Nov. 2001, pp. 1-28.

(Continued)

*Primary Examiner* — Wayne Young
*Assistant Examiner* — James L Habermehl
(74) *Attorney, Agent, or Firm* — Zilka-Kotab, PC

(57) ABSTRACT

A product according to one embodiment includes a magnetic recording tape having at least one first servo track having timing information, and a supplemental servo track having at least one of: velocity encoding and longitudinal position encoding. An apparatus according to one embodiment includes a magnetic head and at least one module having an array of transducers. The apparatus is configured to read and/or write to magnetic recording media having at least one first servo track having timing information, and a supplemental servo track having at least one of: velocity encoding and longitudinal position encoding.

17 Claims, 13 Drawing Sheets

(56) References Cited

U.S. PATENT DOCUMENTS

2012/0236433 A1 9/2012 Koeppe
2012/0307399 A1 12/2012 Hoerger et al.
2013/0107393 A1 5/2013 Cherubini et al.
2014/0376123 A1 12/2014 Biskeborn

OTHER PUBLICATIONS

Wilkinson, J.H., "The Serial Digital Data Interface (SDDI)," International Broadcasting Convention, Sep. 12-16 1996, IEEE, pp. 425-430.

* cited by examiner

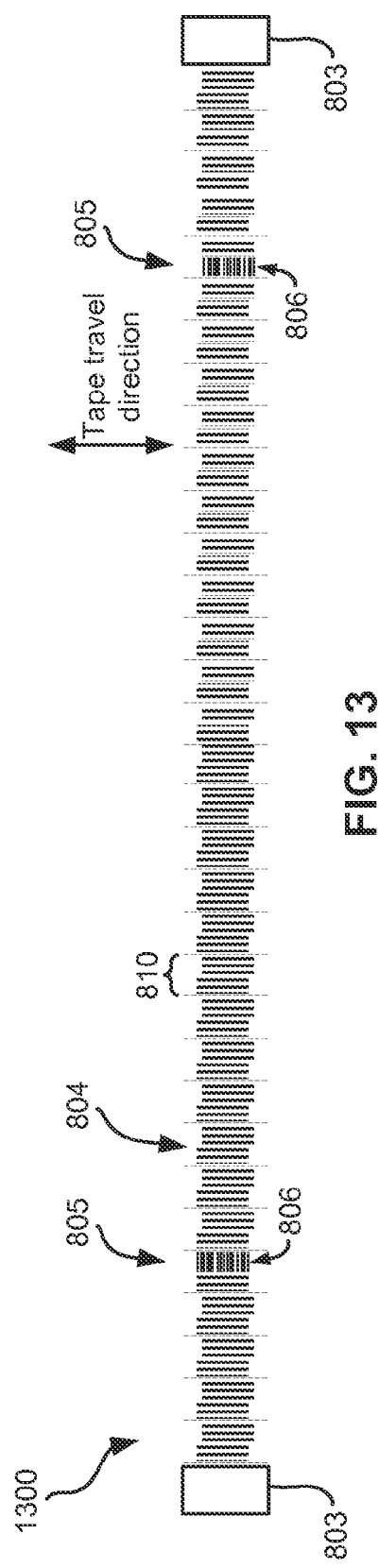
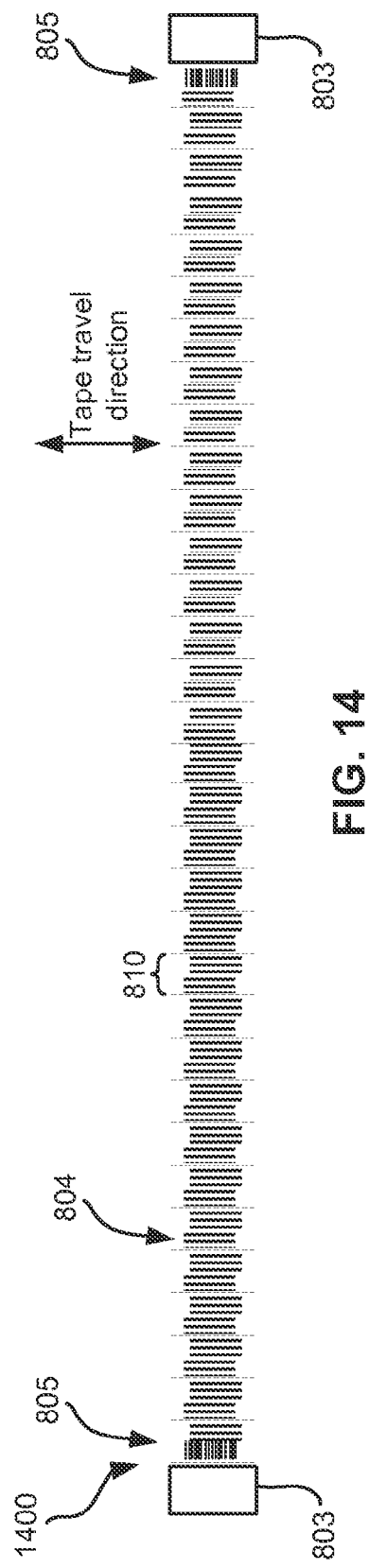

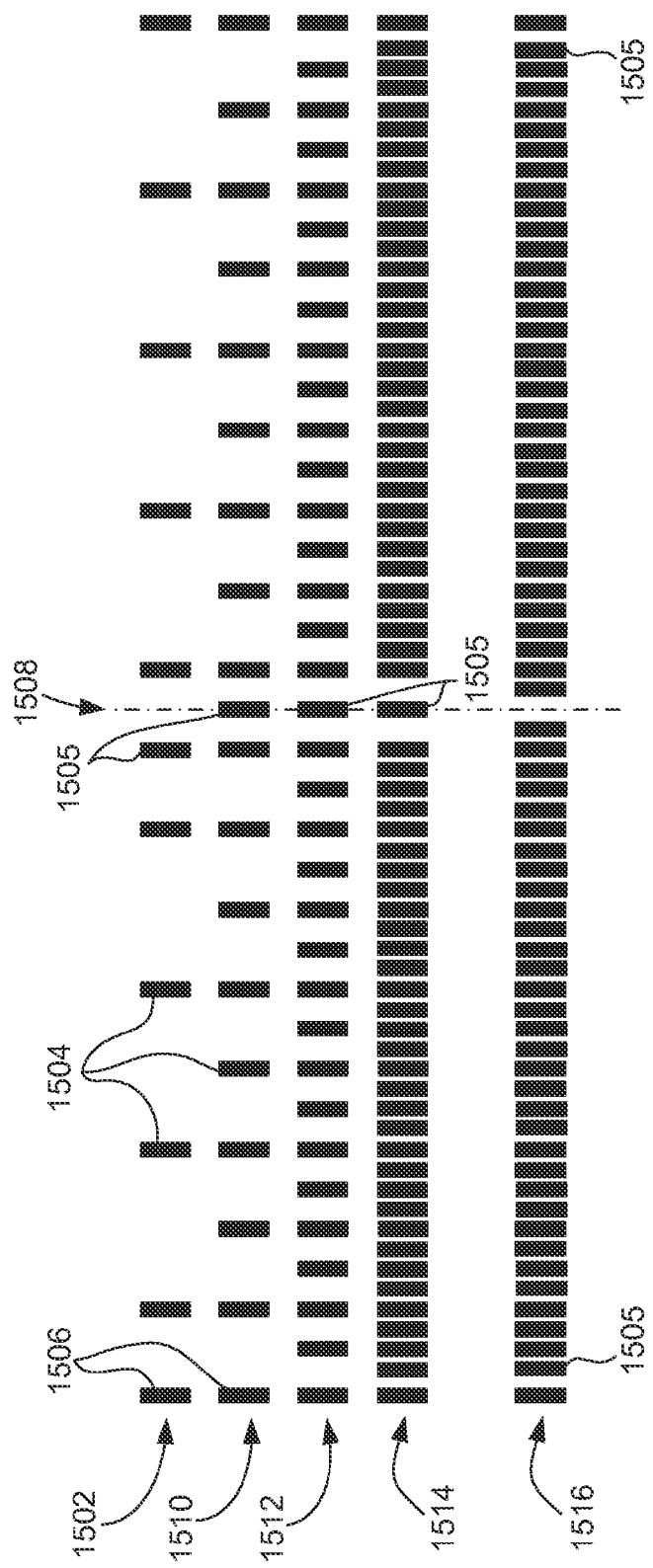

RECORDING MEDIUM HAVING INDEPENDENT TRACK FOR VELOCITY, TIMING AND/OR LONGITUDINAL POSITION

BACKGROUND

The present invention relates to data storage systems, and more particularly, this invention relates to data storage systems having independent (e.g., supplemental) servo tracks with velocity encoding and/or longitudinal position encoding embodied therewith.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

A continuing goal in tape drive systems is effectively managing placement of tracks on tape. In particular, track density is nearly doubling every generation to achieve an approximately 40% per year growth in cartridge capacity within each product family. Another goal is to manage head and electronics designs as channels are added to allow data rate to keep pace with the growing number of data tracks. For example, ongoing goals include using fewer, more integrated ASICs, a least possible number of head channels, and elimination of multiplexing.

BRIEF SUMMARY

A product according to one embodiment includes a magnetic recording tape having at least one first servo track having timing information, and a supplemental servo track having at least one of: velocity encoding and longitudinal position encoding.

An apparatus according to one embodiment includes a magnetic head and at least one module having an array of transducers. The apparatus is configured to read and/or write to magnetic recording media having at least one first servo track having timing information, and a supplemental servo track having at least one of: velocity encoding and longitudinal position encoding.

A computer program product for determining a position error signal. The computer program product includes a computer readable storage medium having program instructions embodied therewith, the program instructions readable and/or executable by a hardware-based controller to cause the controller to: read, by the controller, timing information from at least one of a pair of servo tracks on a magnetic recording tape; simultaneously read, by the controller, velocity encoding and/or longitudinal position encoding from a supplemental servo track separated from each of the pair of servo tracks; compute, by the controller, a current position of a magnetic head using at least the timing information as well as the velocity encoding and/or longitudinal position encoding; and determine, by the controller, a position error signal of the magnetic head using the current position.

Any of these embodiments may be implemented in a magnetic data storage system such as a data storage drive, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 13 is a partial representational view of a data band of a magnetic recording tape having a non-contiguous spare area, according to one embodiment.

FIG. 14 is a partial representational view of the data band of a magnetic recording tape having a non-contiguous spare area, according to one embodiment.

FIG. 15 is a representational view of transducer layouts having varying numbers of active channels and both symmetrical and asymmetrical sub-arrays, according to various embodiments.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several embodiments of magnetic storage systems, as well as operation and/or component parts thereof, which include a preferred servo format. Various embodiments described herein include magnetic recording tape utilizing high density timing based servo pattern with separate tracks for timing, velocity encoding and longitudinal encoding, as will be described in further detail below.

In one general embodiment, a product includes a magnetic recording tape having at least one first servo track having timing information, and a supplemental servo track having at least one of: velocity encoding and longitudinal position encoding.

In one general embodiment, an apparatus includes a magnetic head and at least one module having an array of transducers. The apparatus is configured to read and/or write to magnetic recording media having at least one first servo track having timing information, and a supplemental servo track having at least one of: velocity encoding and longitudinal position encoding.

In yet another general embodiment, a computer program product for determining a position error signal includes a computer readable storage medium having program instructions embodied therewith, the program instructions readable and/or executable by a hardware-based controller to cause the controller to: read, by the controller, timing information from at least one of a pair of servo tracks on a magnetic recording tape; simultaneously read, by the controller, velocity encoding and/or longitudinal position encoding from a supplemental servo track separated from each of the pair of servo tracks; compute, by the controller, a current position of a magnetic head using at least the timing information as well as the velocity encoding and/or longitudinal position encoding; and determine, by the controller, a position error signal of the magnetic head using the current position.

Figure 1A:
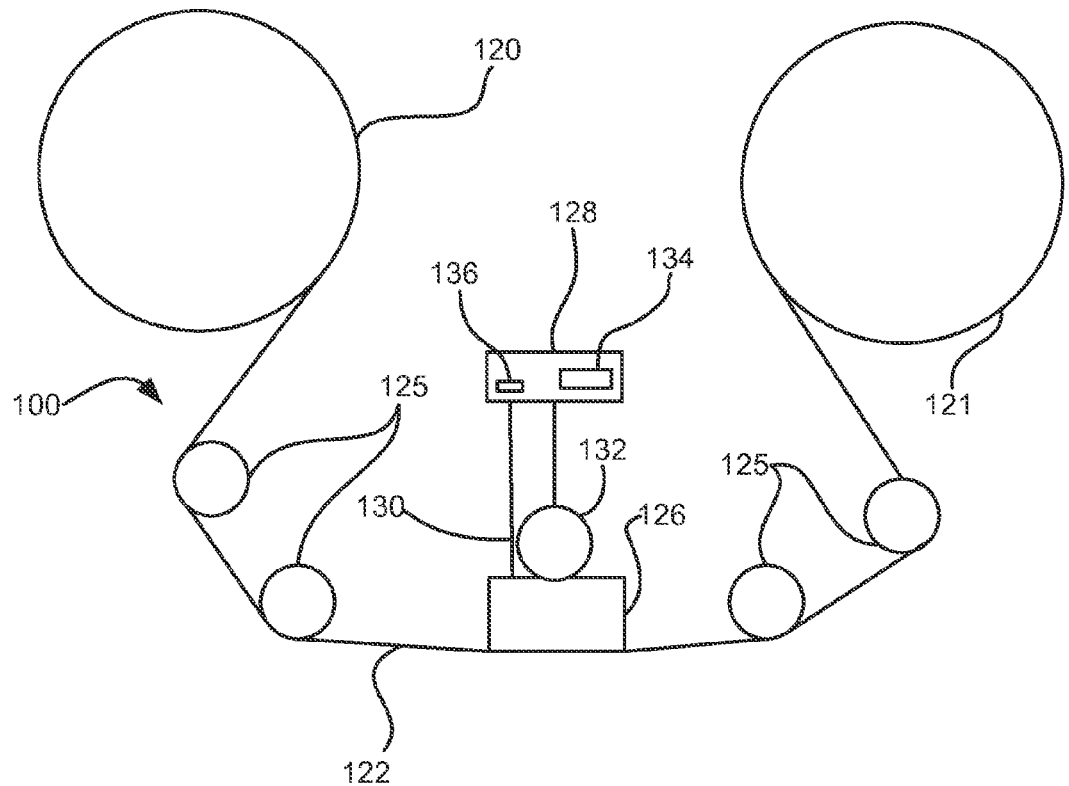
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
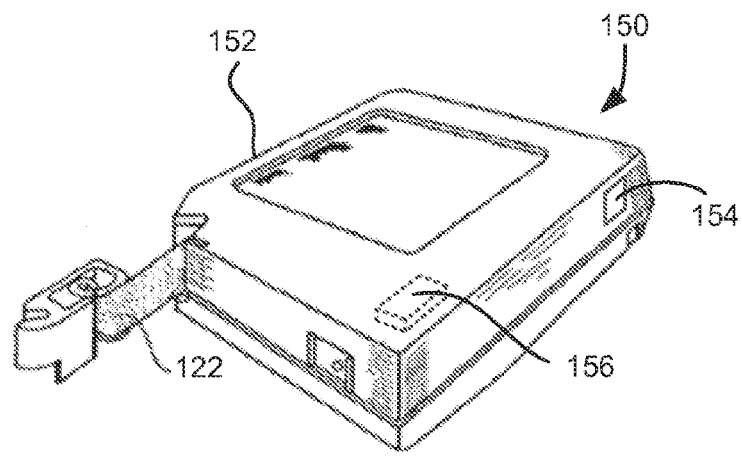
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
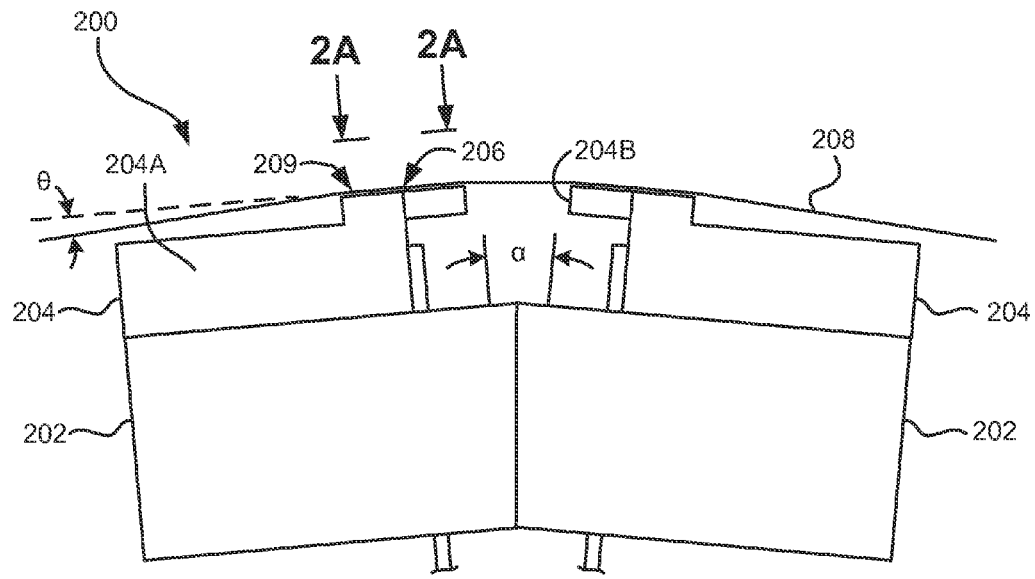
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
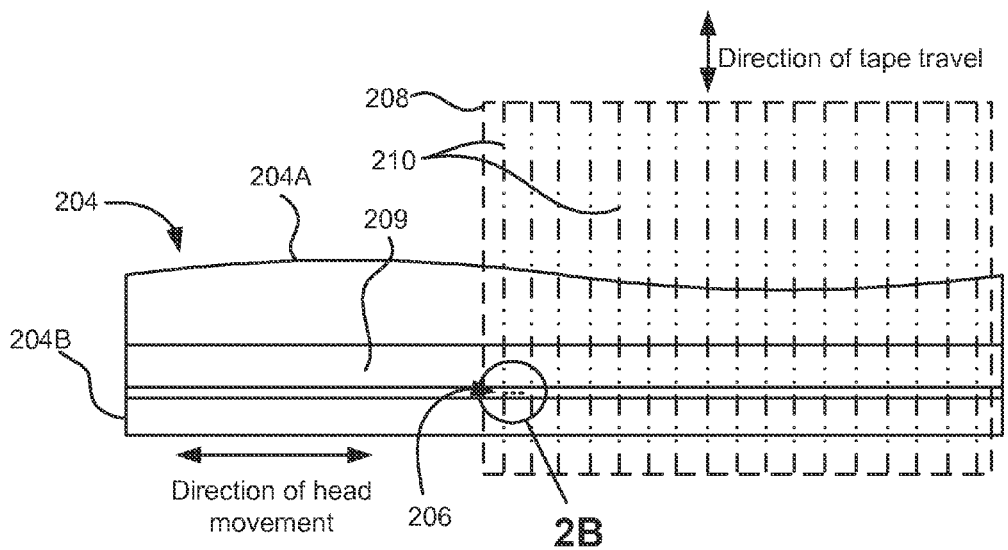
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
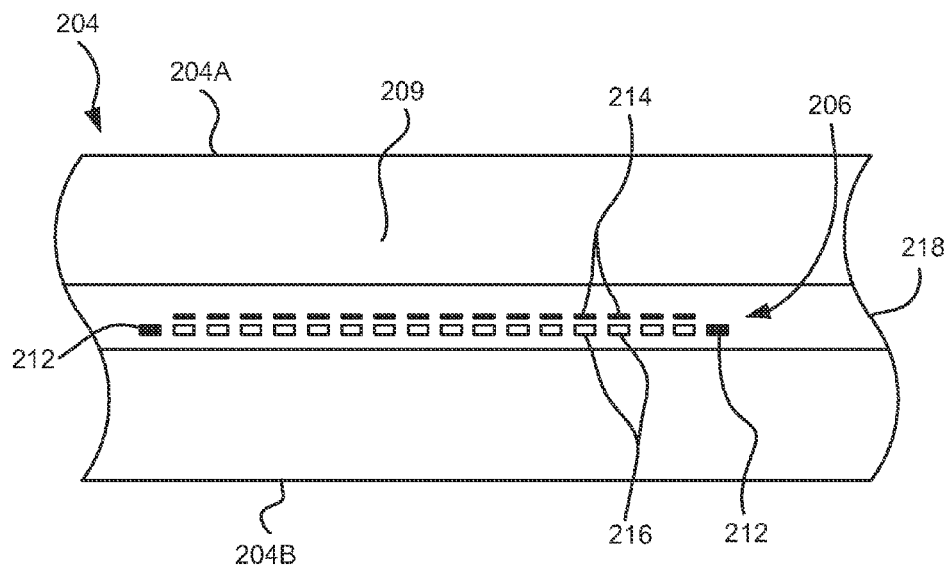
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader and/or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
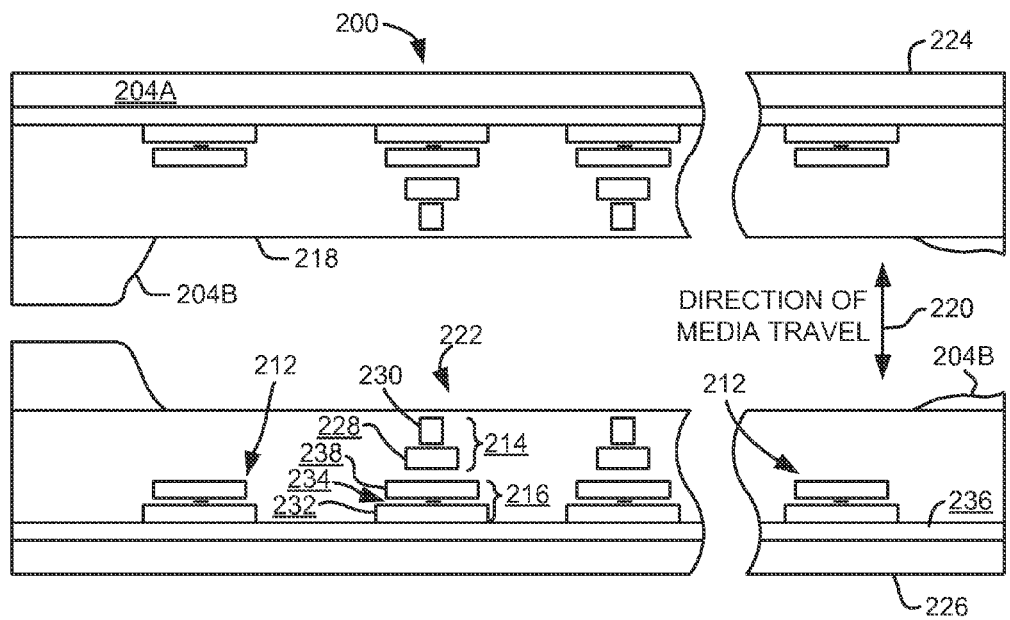
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
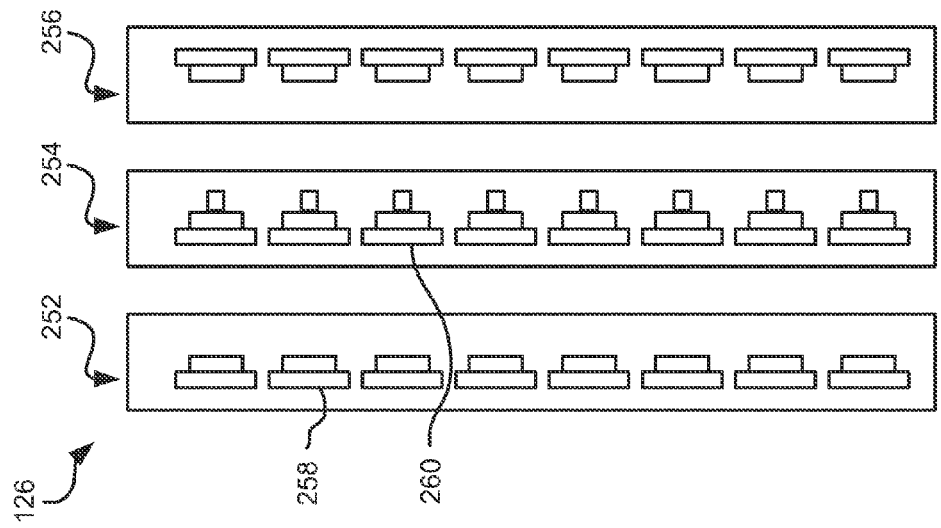
FIG. 4 is a partial tape bearing surface view of a magnetic head having a read-write-read configuration.
Figure 3:
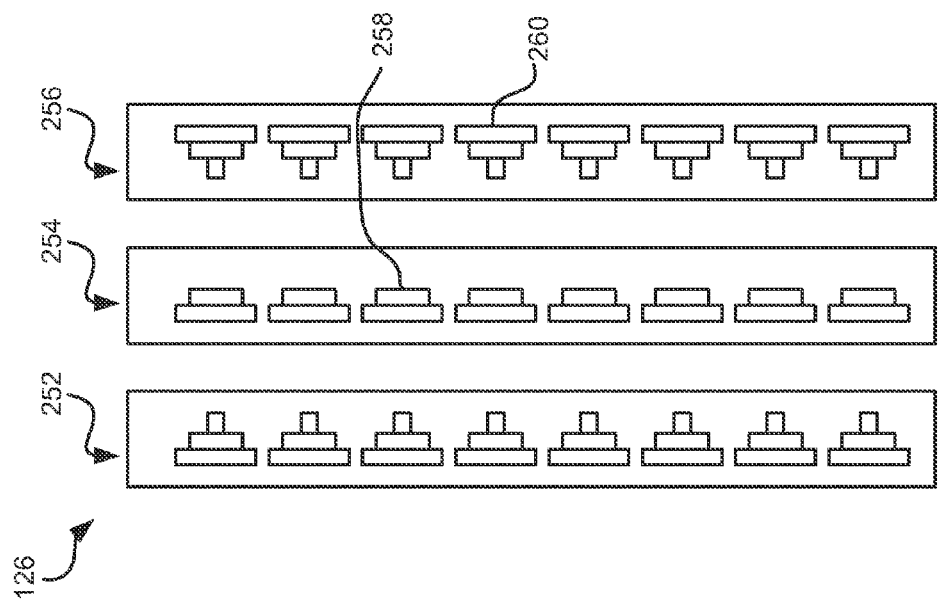
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
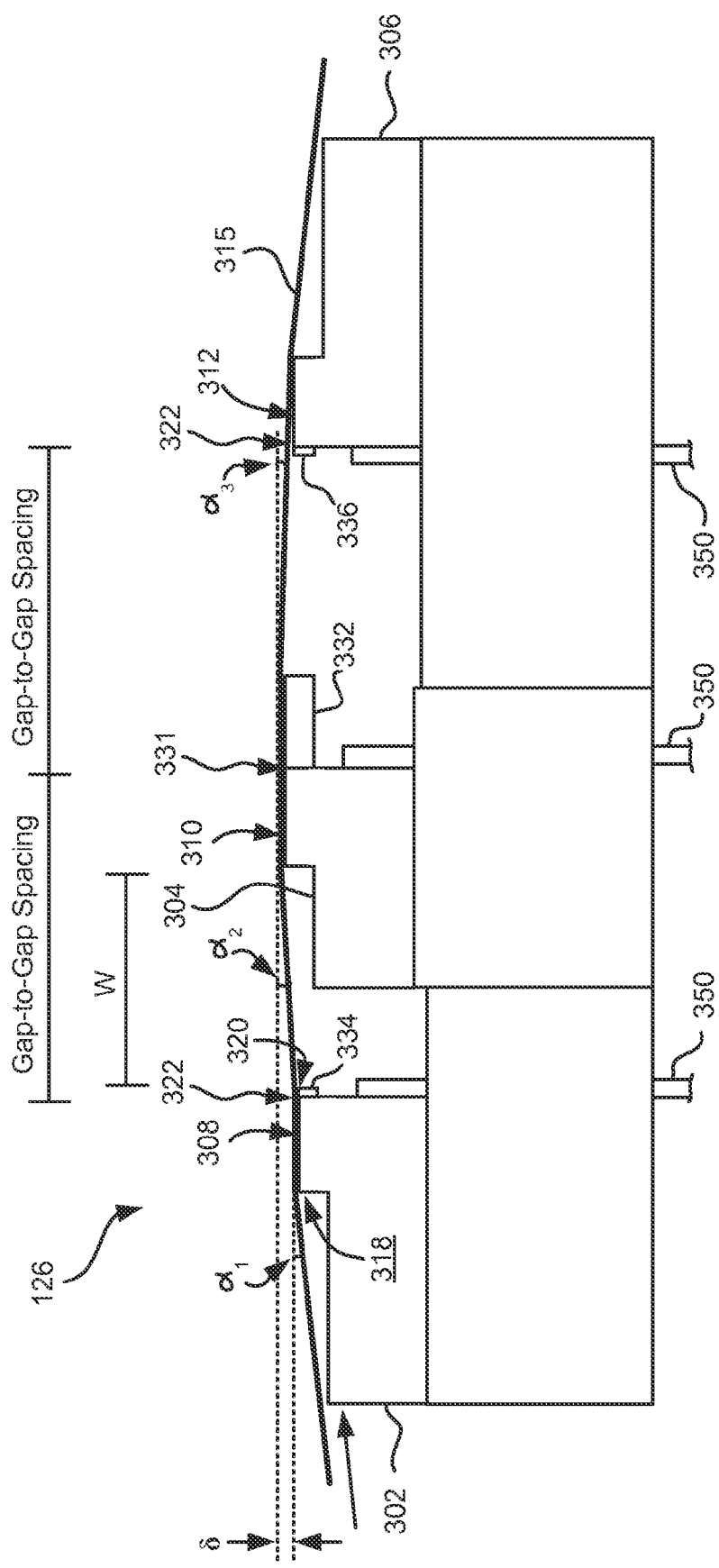
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
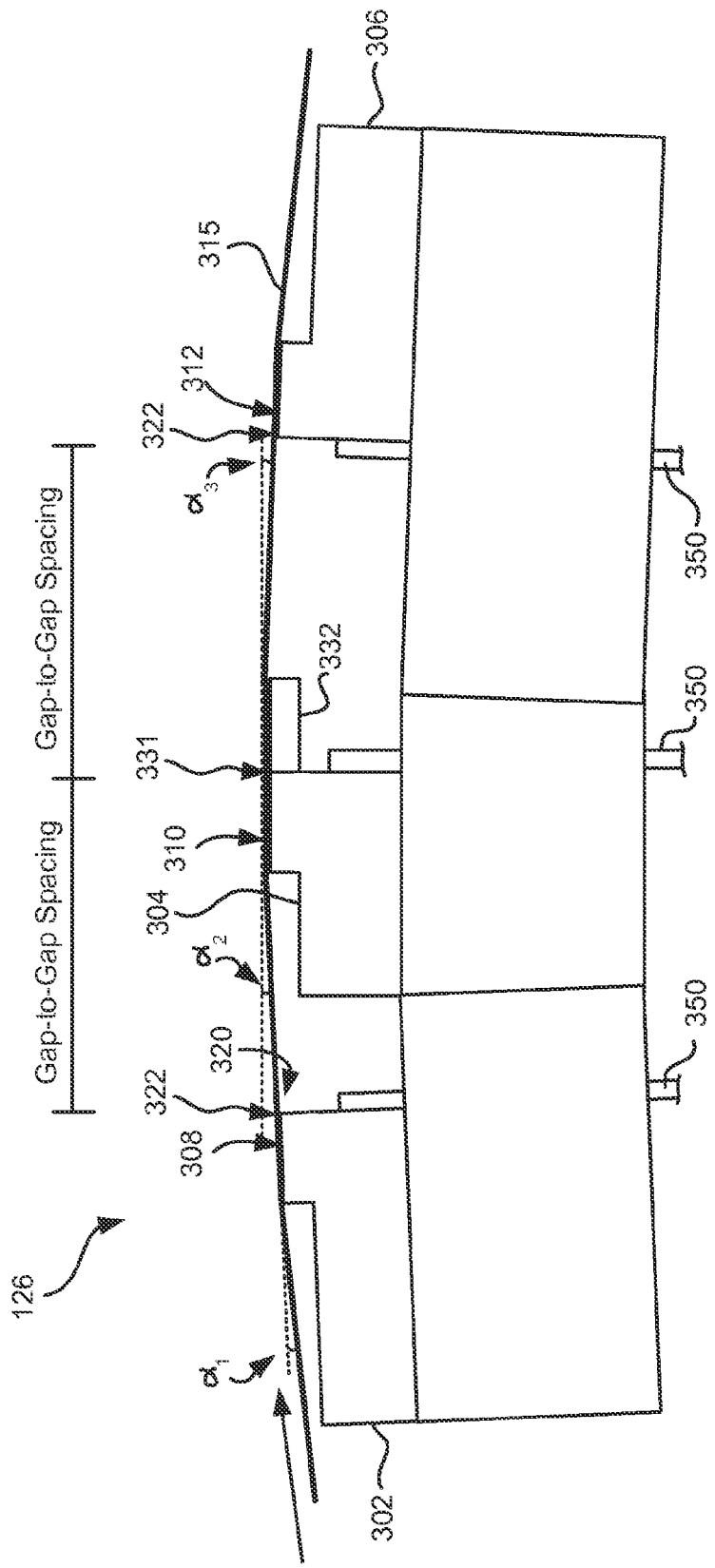
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
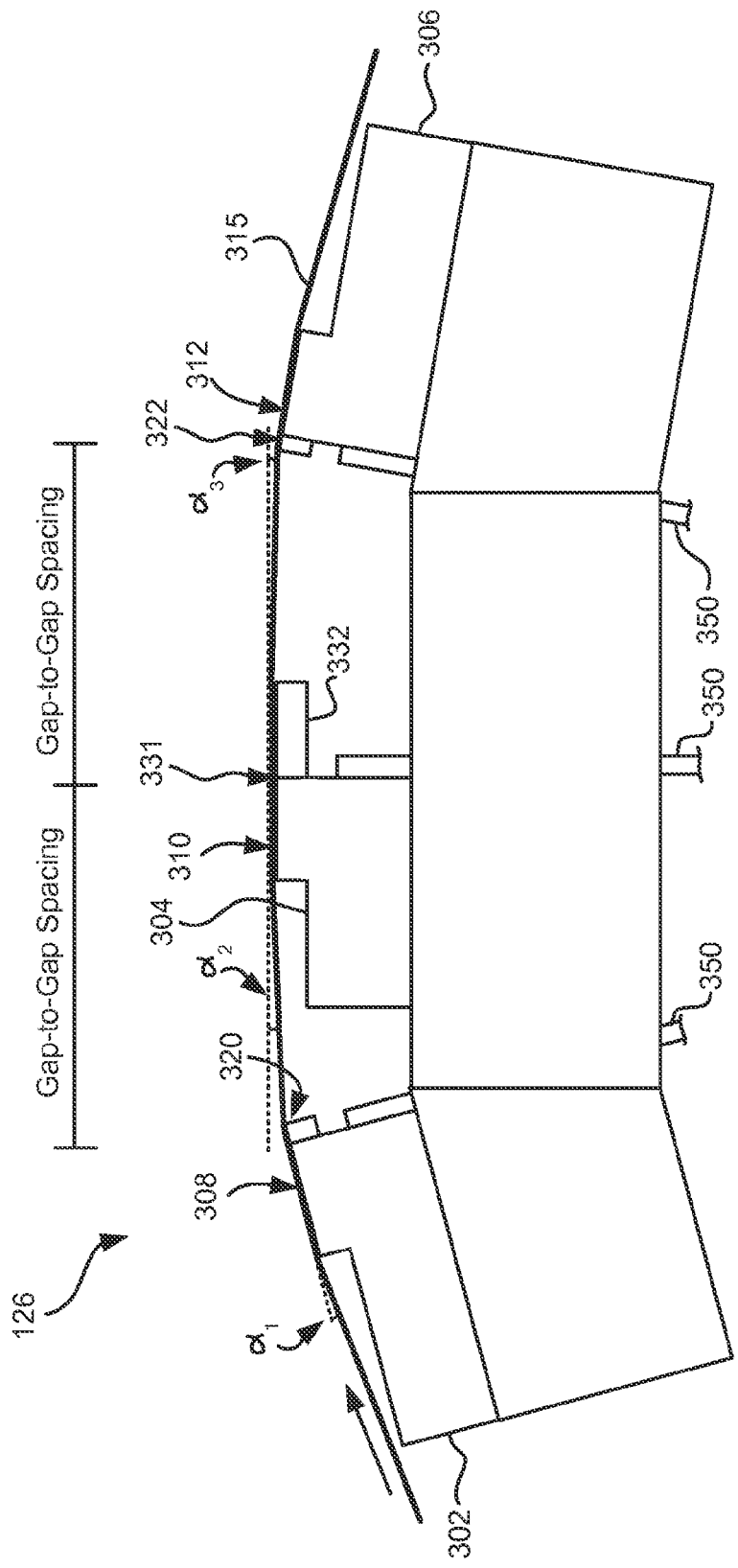
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As alluded to above, various embodiments described herein are associated with a servo format for magnetic tape recording products and systems. Such servo format addresses the desire for a configuration that enables a high density servo pattern, e.g., by utilizing spare area of tape. Moreover, some embodiments may additionally provide backward compatibility to at least a previous generation having fewer active transducer channels in use per wrap.

Consider, for example, Linear Tape Open, $3^{rd}$ generation (LTO-3), which is a 16 channel format that is backward compatible to LTO-2, which is an 8 channel format. LTO was created at the outset to accommodate both 8 and 16 channel formats, and thus enable a transition from 8 to 16 channels. Continuing with this example, transitioning from LTO-3 to 32 channels and keeping backward compatibility means the pitch between channels needs to be halved again. Done as proposed herein, this creates an asymmetry in the format, resulting in creation of spare area in a given data band.

According to the various embodiments described and/or suggested herein, "spare area" refers to an area on a magnetic recording tape, extending along a longitudinal length thereof, which is unattainable for user data in the format being used. Rather, the spare area may be predetermined to include a supplemental servo track separated from the other servo tracks, as will be described in further detail below. Moreover, in some approaches, spare area may be defined as area that is not a guard band positioned adjacent the servo tracks.

In various embodiments, the spare area created by doubling the number of channels in, for example, an LTO format is contiguous. In one approach, the spare area that is created is contiguous when, for example, the number of channels is doubled in a format wherein the number of active channels is modulo 4, 8, 16, etc. A contiguous spare area is one where all the area not written to when a data band is fully written occupies one area of the tape, e.g., as a stripe along the length of the tape. However, it should be noted that this does not include guard bands adjacent the servo tracks. The contiguous spare area may be centered in the format, may be placed proximate to servo tracks (e.g., as the spare area on the right hand side of FIG. 11 as opposed to a guard band on the left hand side of FIG. 11 between the servo track 803 and data tracks), or at any point therebetween.

As previously mentioned, servo tracks of conventional products are plagued with the inability to increase timing-based servo performance. Specifically, conventional timing-based servo patterns determine lateral position error as well as longitudinal position along a length of tape, e.g., in a single frame. It follows that conventional servo patterns require both chevrons and velocity bars to determine this information. Moreover, these issues further limit the achievable track density for a given angle and servo track width. For example, generating a lateral position error signal requires chevrons patterns and velocity bars, while the longitudinal position of a given tape may be encoded by dithering the timing of chevron pairs. However, these requirements effectively dilate the servo frame, thereby significantly reducing the timing-based servo performance as well as the track density. Some conventional products attempt to remedy the lateral position encoding issues by including "N" shaped servo pattern rather than an "M" shaped servo pattern as would be appreciated by one skilled in the art. However, such attempts still fail to address the longitudinal position encoding problems experienced in conventional products.

In sharp contrast, various embodiments described herein are capable of enabling a high density servo pattern to be written into the spare area of a tape format, thereby overcoming the foregoing conventional pitfalls. Specifically, tape servo formats described herein include placing longitudinal and/or velocity encoding information in a separate track (also referred to herein as a supplemental servo track) of a tape, which is preferably located in a spare area on the tape, e.g., such as spare area 805 illustrated in FIG. 8.

Figure 8:
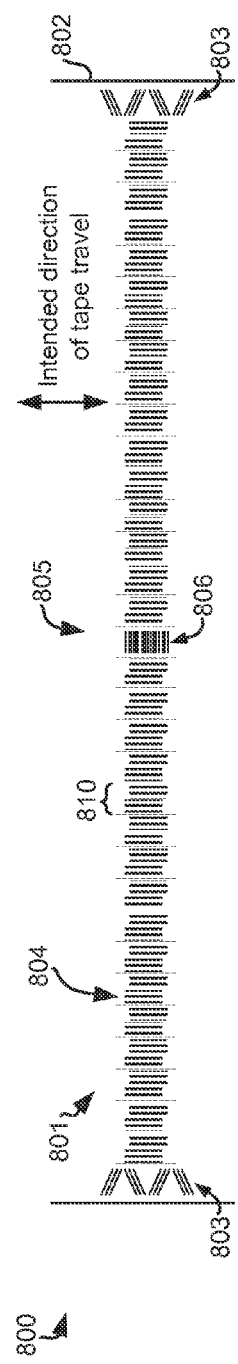
FIG. 8 are partial representational views of a data band of a magnetic recording tape having a contiguous spare area positioned centrally, according to two embodiment.

FIG. 8 depicts a partial view of an embodiment of a product 800 in the form of a magnetic recording tape 802, in accordance with one embodiment. As an option, the present product 800 may be implemented in conjunction with features from any other embodiment listed herein, such as those described with reference to the other FIGS. For example, the product 800 may be embodied as a cartridge, such as that shown in FIG. 1B, and having a cartridge memory with data therein specifying the format. Of course, however, such product 800 and others presented herein may be used in various applications and/or in permutations which may or may not be specifically described in the illustrative embodiments listed herein. Further, the product 800 presented herein may be used in any desired environment.

Figure 9A:
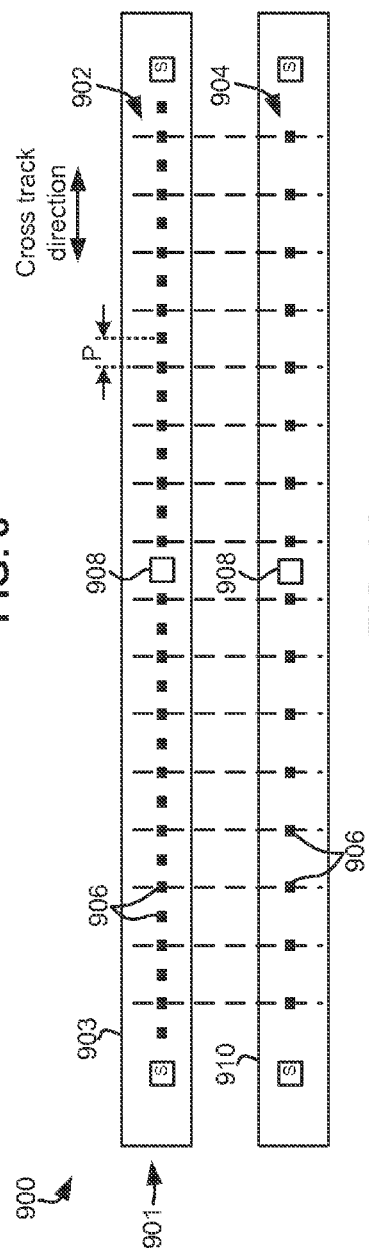
FIG. 9A is a partial representational view of an array of transducers positioned according to a format, according to one embodiment, and an array of transducers positioned according to a second format.

Referring to FIG. 8, servo tracks 803 are shown sandwiching a single data band 801 of the product 800 which, as previously mentioned, is in the form of a magnetic recording tape 802, which itself may have several such data bands. The format of product 800 preferably specifies modulo an even number, e.g., 2, 4, 8, 16, 32, 64, etc., of active channels for recording and/or readback. Accordingly, the example shown specifies a 32 channel format, which is in no way intended to limit the invention, thereby enabling reading and/or writing of 32 data tracks 804 simultaneously. However, the magnetic recording tape 802 of product 800 further includes a contiguous spare area 805 that is centered relative to the data tracks 804, and correspondingly, centered in a cross track direction, e.g., relative to edges of a corresponding data band. In other words, each data band may have a spare area 805 which is preferably centered relative to the edges thereof. Although the present description includes the spare area 805 being centered relative to the edges of a data band, the spare area 805 may be centered relative to other points of reference. For example, a spare area 805 may be centered relative to flanking servo tracks, subarrays of a given array of transducers which may be used to read and/or write data tracks 804 as seen in FIG. 9A, etc. However in other approaches, a spare area 805 may be offset from a centered position, e.g., see FIGS. 11-13.

Referring still to FIG. 8, the magnetic recording tape 802 of product 800 is illustrated as having a supplemental servo track 806 positioned in the contiguous spare area 805 of the magnetic recording tape 802, e.g., between the servo tracks 803 of a given data band.

The supplemental servo track 806 preferably includes velocity encoding and/or longitudinal position encoding of the magnetic recording tape 802, while at least one of the servo tracks 803 may include timing information in the chevron patterns thereof. In some approaches, the supplemental servo track 806 and/or the servo tracks 803 may also have skew information encoded therewith. However, it should be noted that in some embodiments, neither of the servo tracks 803 include velocity encoding and/or longitudinal position encoding. As a result, chevron patterns of the servo tracks 803 may be shortened as the low frequency/low density velocity encoding and/or longitudinal position encoding has been moved from the servo tracks 803 to a supplemental servo track 806 located in a spare area on the magnetic recording tape 802. For example, as illustrated in FIG. 8, the servo tracks 803 include groupings of three chevron patterns compared to conventional five-four patterns, thereby desirably shortening the servo frames and increasing the frame rate at a given tape velocity, as would be appreciated by one skilled in the art upon reading the present description. Moreover, if the supplemental servo track 806 is factory written simultaneously with the chevron patterns of the servo tracks 803, during readback velocity data and/or longitudinal position data may be captured at the same time as the timing data for improved overall accuracy.

Although the supplemental servo track 806 includes a series of lines and/or marks positioned perpendicular the intended direction of tape travel in the present approach, in other approaches the lines and/or marks may be written such that they are oriented at any desired angle, e.g., relative to the intended direction of tape travel.

According to preferred embodiments, the spare area of a data band may be centered relative to data tracks of the data band 801 and therefore the supplemental servo track 806 may be centered relative to data tracks of the data band. However, in alternate embodiments, the spare area and consequently a supplemental servo track 806 of a data band may be offset from a center of the data band defined between an adjacent pair of first servo tracks. e.g., see FIGS. 11-14. In still further approaches, a data band may include more than one spare area between a given pair of servo tracks, e.g., as illustrated in FIG. 13, in which case more than one supplemental servo track may be included. For example, an apparatus may include additional servo readers for detecting the added servo tracks which may easily be fabricated using existing thin film magnetic head technology. Thus, a head having such an apparatus may be enabled to decode new formats.

However, it should be noted that regardless of the positioning and/or configuration of the spare area 805 and/or the supplemental servo track 806, it is preferred that the servo tracks 803 are separated from the supplemental servo track 806. With reference to the present description, "separated" is intended to mean that the servo tracks 803 are spatially separated from the supplemental servo track 806, e.g., in a cross track direction.

With continued reference to FIG. 8, the magnetic recording tape 802 further includes a pair of servo tracks 803 as previously mentioned. It should be noted that although the present embodiment depicts a pair of servo tracks 803, other embodiments may include at least one servo track for a given data band of a magnetic recording tape.

The servo tracks 803 and/or data in the spare area 805 and/or the supplemental servo track 806 may be written to a commercially-available tape product using one or more writers configured to write such marks and/or data, as would become apparent to one skilled in the art upon studying the present disclosure, and which could be created by such skilled artisan without undue experimentation.

FIG. 9A depicts a representational view of an apparatus 900 in the form of an array of transducers of a magnetic head, not to scale, in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment.

Referring to FIG. 9A, the apparatus 900 includes a magnetic head 901. Furthermore, the magnetic head 901 includes a module 903 on which an array 902 of transducers 906 is positioned according to a format of a magnetic recording tape. The array 902 of transducers 906 preferably further includes a supplemental servo reader 908 capable of reading a supplemental servo track. Servo readers S are also shown flanking the array 902 of transducers 906. Thus, the apparatus 900 is configured to read and/or write to a magnetic recording tape of a corresponding format, such as that of the product 800 illustrated in FIG. 8. As described above, the magnetic recording tape format of FIG. 8 includes at least one servo track having timing information encoded thereon, in addition to a supplemental servo track having velocity encoding and/or longitudinal position encoding embodied therewith. Moreover, it again should be noted that the at least one servo track preferably does not include velocity encoding and/or longitudinal position encoding.

When the array 902 of transducers 906 is viewed in conjunction with the data band of FIG. 8, it becomes apparent that the supplemental servo track 806 is centered relative to the array 902 of transducers 906. For simplicity, the term "spare area" may be used herein to also describe area on the magnetic head that corresponds to the spare area on the magnetic recording tape. Thus, the array 902 of transducers 906 is logically divided into two symmetrical subarrays oriented about the spare area position and/or center point of the array. The symmetry of the resultant format not only facilitates using the spare area for other functions if desired, but also greatly simplifies fabrication of the apparatus used for recording data in this format. Furthermore, the apparatus may be deployed in a manner that obviates a need for transducer multiplexing, etc.

As alluded to above, the array 902 of transducers 906 preferably further includes a supplemental reader 908 for reading data in the spare area. For example, the supplemental reader 908 shown in FIG. 9A, by way of example only, is a supplemental servo reader for reading a supplemental servo track, e.g., see 806 of FIG. 8. Thus, referring still to FIG. 9A, the supplemental servo reader 908 may be positioned between the symmetrical subarrays of the array 902 of transducers 906. Depending on the desired approach, the supplemental servo reader 908 may be of a type similar and/or the same as servo readers S. However, in other approaches, the supplemental servo reader 908 may simply be a transducer 906 which has been modified to read the supplemental servo track 806.

The width of the inactive region may be approximately 2× the center to center transducer pitch P in one of the subarrays. However, the resulting spare area on the tape has a width about equal to a sub-data band 810 (FIG. 8, e.g., adjacent tracks written by a single transducer or otherwise corresponding to the lateral range of one transducer position in the array). The sub-data band 810 itself, when fully written, may be about equal to the center-to-center transducer pitch P.

As previously mentioned, some embodiments described herein may provide backward compatibility to one or more previous generations of tape having fewer active transducer channels in use per wrap. In order to provide the backward compatibility with a second format, having a smaller number of active channels than the first array 902, and where the smaller number is modulo an even number, various transducers of the array 902 are generally positioned as specified in the second format as well. To exemplify, FIG. 9A also depicts a second module 910 having a second array 904 of transducers 906, not to scale, at positions specified by the second format. According to one approach, if the second format specified N channels, the array according to the format may have 2×N or 2×N+1 transducers.

The transducers 906 of the second array 904 of apparatus 900 may be configured to read and/or write to a magnetic recording tape according to the second (e.g., legacy) format, where no contiguous spare area is created when a data band is fully written in the second format. The apparatus may also be configured to read and/or write to a magnetic recording tape according to the (e.g., newer) format, where the contiguous spare area is created when a data band is fully written in the format.

Thus, depending on the desired embodiment, the format may specify a data structure on the magnetic recording tape, such as a number of active data channels used to read and/or write to the tape, general locations of data tracks on the magnetic recording tape, and a spare area on the magnetic recording tape, where the spare area may be contiguous. The format may also specify backward compatibility with a second format (e.g., a legacy format). In one approach, the second format specifies a smaller number of active channels than the number of active channels specified by the aforementioned format. Moreover, the number of active channels specified in the first and/or second format may be modulo an even number, where "modulo" means "a multiple of." The second format in various approaches may specify no spare area, a split spare area, or a contiguous spare area.

It is preferred that more than one supplemental servo reader is able to read a supplemental servo track. For example, each of the modules 903, 910 illustrated in the embodiment of FIG. 9A include a supplemental servo reader 908, both of which are aligned to read a common supplemental data track, e.g., 806 of FIG. 8. This redundancy prevents data loss in the event that one of the supplemental servo readers 908 fails.

Figure 9B:
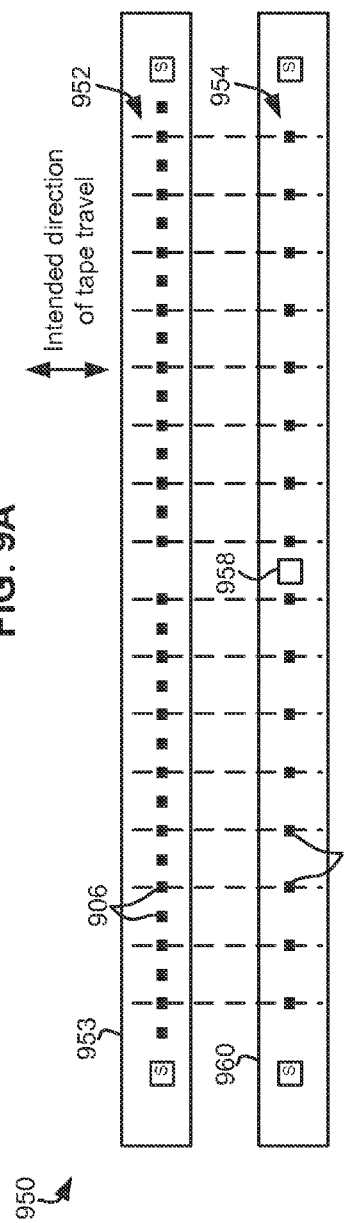
FIG. 9B is a partial representational view of an array of transducers positioned according to a format, according to one embodiment, and an array of transducers positioned according to a second format.

However, although each of the modules 903, 910 illustrated in the embodiment of FIG. 9A include a supplemental servo reader 908, other embodiments may include alternate configurations. For example, looking to the apparatus 950 of FIG. 9B, a first module 953 may include a first array 952 of transducers 906 which does not include a supplemental servo reader. However, a second module 960 having a second array 954 of transducers 906 may be positioned relative to the first module 953 such that the transducers of the second module 960 may be aligned with the transducers of the first module 953 in the intended direction of tape travel therealong. Furthermore, the second module 960 may additionally include a supplemental servo reader 958 for reading supplemental servo tracks from magnetic recording tapes, e.g., such as that shown in FIG. 8. It follows that the data being read and/or written by the first and second modules 953, 960 of FIG. 9B may be coordinated, e.g., by a controller. In other words, the supplemental servo track data read by the supplemental servo reader 958 on the second module 960 may be accessed and preferably utilized by the first module 953 and/or any controlling device embodied therewith.

Additional embodiments may include alternate configurations such as a third module, e.g., see FIGS. 5-7. Accordingly, two of the modules may include a supplemental servo reader for reading a supplemental servo track while the third module does not. In some approaches, write transducers positioned on one or more of the modules may be converted to function as a supplemental servo reader. However, in preferred approaches, a supplemental servo reader may be added to a spare area of a module as described above.

Figure 10A:
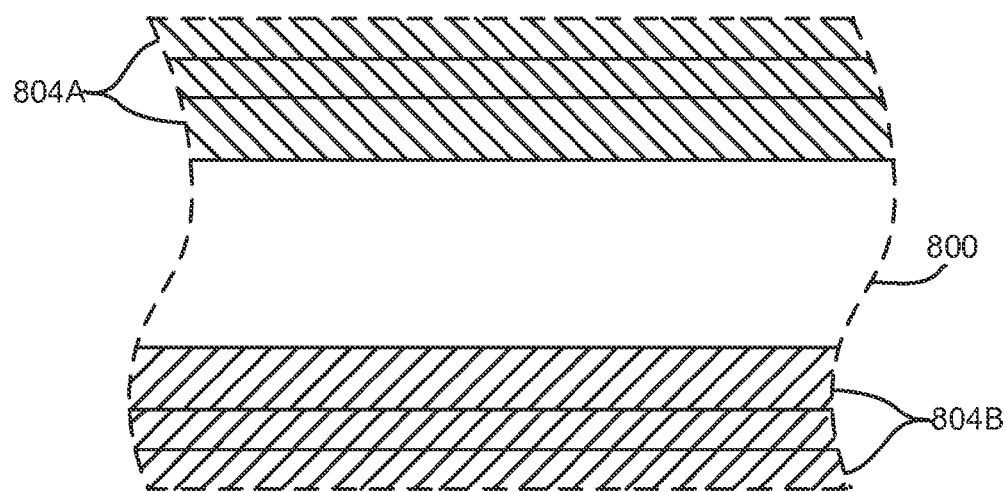
FIG. 10A is a representational diagram of a tape with shingled tracks written in a serpentine fashion according to one embodiment.
Figure 10B:
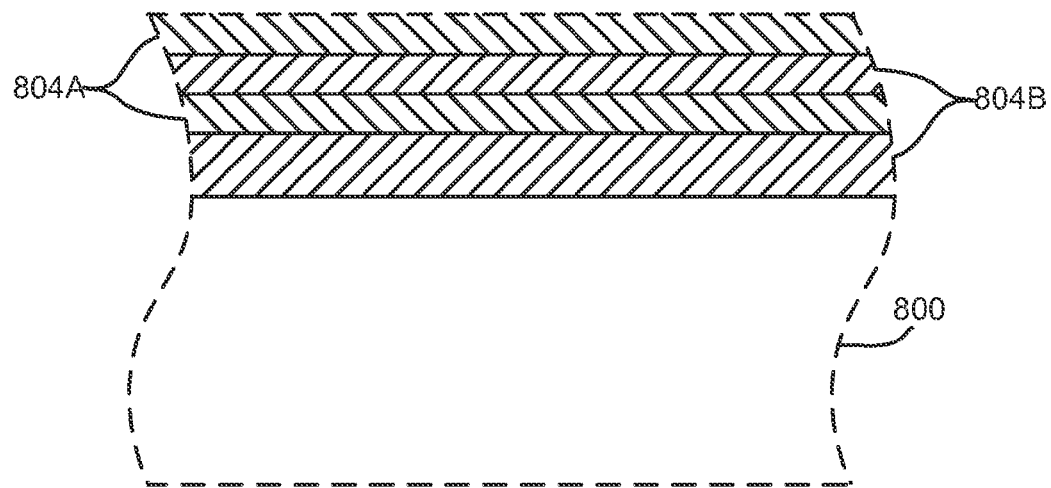
FIG. 10B is a representational diagram of a tape with shingled tracks written in a non-serpentine fashion according to one embodiment.

According to various approaches, apparatuses 900, 950 may be configured for non-serpentine and/or serpentine writing. Additional arrays may be present to enable bidirectional writing, read while write capability, etc. The data tracks 804 of FIG. 8 are depicted as being written in a serpentine manner. FIG. 10A depicts shingled data tracks written in a serpentine manner, with tracks 804A written in a first direction and tracks 804B written in the opposite direction in an alternating fashion, from the outside in, as the tape is moved back and forth in sequential wraps. FIG. 10B depicts shingled data tracks written in a non-serpentine manner.

Figure 11:
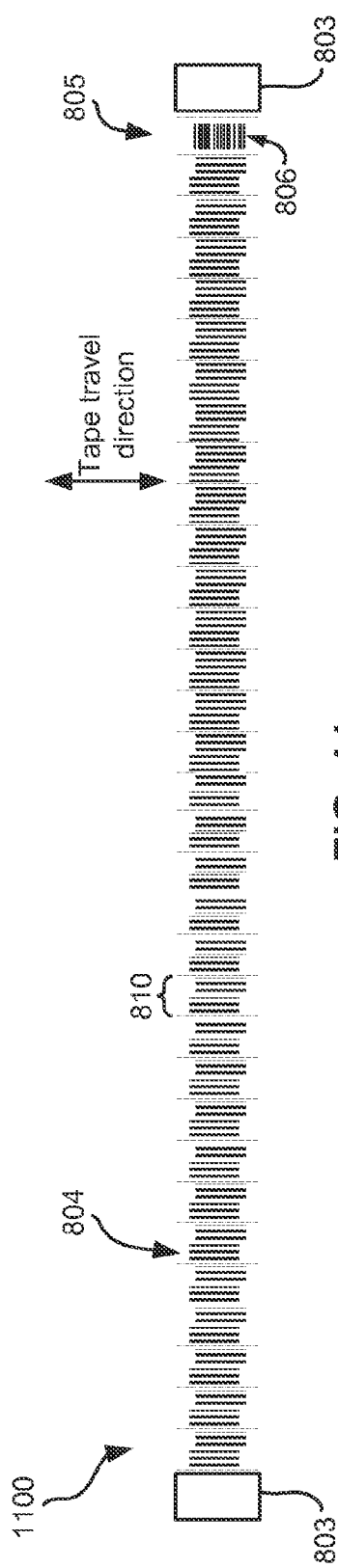
FIG. 11 is a partial representational view of a data band of a magnetic recording tape having a contiguous spare area, according to one embodiment.

FIG. 11 depicts a partial view of another embodiment of a product 1100 in the form of a magnetic recording tape, in accordance with one embodiment. As an option, the present product 1100 may be implemented in conjunction with features from any other embodiment listed herein, such as those described with reference to the other FIGS. For example, the product 1100 may be embodied as a cartridge, such as that shown in FIG. 1A, and having a cartridge memory with data therein specifying the format. Of course, however, such product 1100 and others presented herein may be used in various applications and/or in permutations which may or may not be specifically described in the illustrative embodiments listed herein. Further, the product 1100 presented herein may be used in any desired environment.

As shown, the data band of the product 1100 includes data tracks 804, servo tracks 803, and a spare area 805 that is offset from a center of the data band, and correspondingly from the center relative to the array of transducers during writing of the data tracks. In this example, the spare area 805 includes a supplemental servo track 806 which includes velocity encoding and longitudinal position encoding. Moreover, although supplemental servo track 806 is proximate one of the servo patterns 803 on the magnetic recording tape, it should be clarified that the supplemental servo track 806 and the servo pattern 803 are separated, e.g., do not overlap in the intended direction of tape travel.

Figure 12:
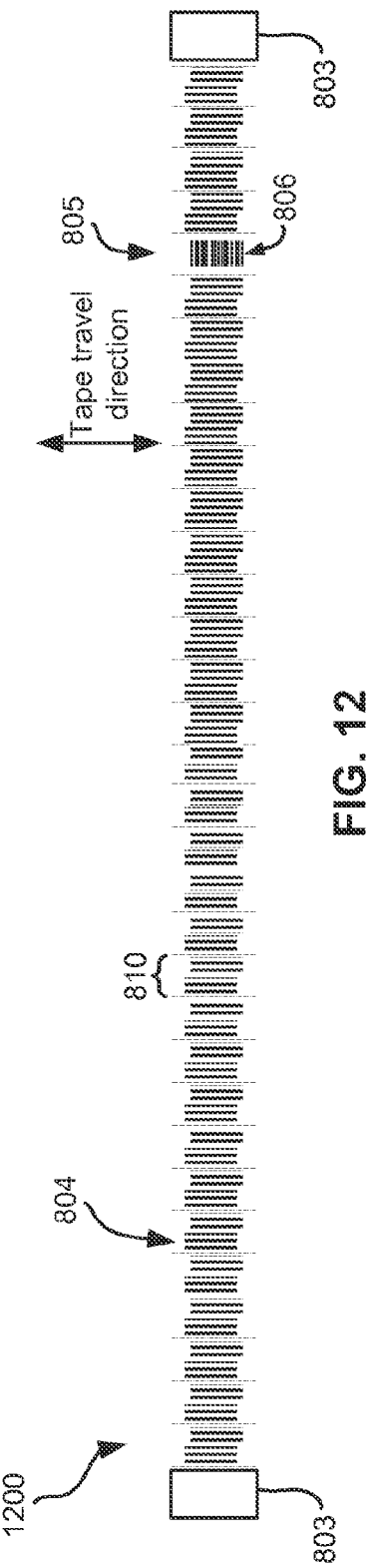
FIG. 12 is a partial representational view of a data band of a magnetic recording tape having a contiguous spare area, according to one embodiment.

FIG. 12 depicts a partial view of another embodiment of a product 1200 in the form of a magnetic recording tape, in accordance with one embodiment. As an option, the present product 1200 may be implemented in conjunction with features from any other embodiment listed herein, such as those described with reference to the other FIGS. For example, the product 1200 may be embodied as a cartridge, such as that shown in FIG. 1A, and having a cartridge memory with data therein specifying the format. Of course, however, such product 1200 and others presented herein may be used in various applications and/or in permutations which may or may not be specifically described in the illustrative embodiments listed herein. Further, the product 1200 presented herein may be used in any desired environment.

As shown, the data band of the product 1200 includes data tracks 804, servo tracks 803, and a spare area 805 that is offset from a center of the data band, and correspondingly from the center relative to the array of transducers during writing of the data tracks. In this example, the spare area 805 is between the center and the outer edge of the data band. Moreover, the spare area 805 again includes a supplemental servo track 806 having velocity encoding and longitudinal position encoding embodied therewith.

Referring to FIGS. 8 and 12, the spare area 805 splits the data band into portions located on opposite sides thereof. The groups of transducers used to write each of the portions, then, can logically be considered subarrays of the transducer array, each subarray being positioned on an opposite side of the spare area (when in use).

The format may thus specify and/or the corresponding apparatus may be configured to, in one mode of operation, write using only one subarray of the transducers positioned on one side of the spare area. This mode may be used to address tape dimensional instability problems, as the width of the data band read and/or written at a given time is less than a width of the entire array.

FIG. 13 depicts a partial view of another embodiment of a product 1300 in the form of a magnetic recording tape, in accordance with one embodiment. As an option, the present product 1300 may be implemented in conjunction with features from any other embodiment listed herein, such as those described with reference to the other FIGS. For example, the product 1300 may be embodied as a cartridge, such as that shown in FIG. 1A, and having a cartridge memory with data therein specifying the format. Of course, however, such product 1300 and others presented herein may be used in various applications and/or in permutations which may or may not be specifically described in the illustrative embodiments listed herein. Further, the product 1300 presented herein may be used in any desired environment.

As shown, the data band of the product 1300 includes data tracks 804, servo tracks 803, and spare areas 805 that are noncontiguous. The spare areas may be positioned in sub-data bands located between the center and outer sub-data bands. Thus, the spare areas 805 may include both data tracks and supplemental servo tracks 806 written thereto. As previously mentioned, the supplemental servo tracks 806 preferably include velocity encoding and longitudinal position encoding embodied therewith. The apparatus for writing such product may include a multiplexer (e.g., in the controller of FIG. 1A) for allowing the apparatus to write and/or read in a legacy format that specifies noncontiguous spare areas.

The format may further specify parameters for reading and/or writing in the spare area, as shown in the product 1400 of FIG. 14, which has noncontiguous spare areas located adjacent the servo tracks 803.

In further embodiments, additional or alternative information may be coded into the spare area(s), e.g., at the tape fabrication factory. For example, the supplemental servo track may include timing encoding. In further embodiments, such information may include date/location of manufacture, production information, including lot, position on jumbo, temperature, humidity, servo writer head deification, tension, etc. In other approaches, information may include auxiliary information such as servo write head dimensions, metadata, etc. In still other approaches, velocity encoding and/or longitudinal position encoding may be written to the spare area, e.g., as illustrated in FIG. 8. The data may be written in an open format, such as is used to store the linear tape file system (LTFS) partition data. Further, because in the preferred embodiment the spare area is located in the center of the data band, the information therein may provide a reference location. Thus, for example, the track containing the data could be very narrow, e.g. 1 um wide (wide enough to read back) and thus serve as reference feature.

Any apparatuses compliant with the format may include at least one transducer for reading and/or writing in the spare area. For example the apparatus 900 of FIG. 9A may have 33 channels in the above embodiments.

FIG. 15 is a representational view of transducer layouts having varying numbers of active channels, and both symmetrical and asymmetrical sub-arrays, according to various embodiments. As an option, any of the present layouts may be implemented in conjunction with features from any other embodiment listed herein, such as those described with reference to the other FIGS. Of course, however, such layouts and others presented herein may be used in various applications and/or in permutations which may or may not be specifically described in the illustrative embodiments listed herein. Further, the layouts presented herein may be used in any desired environment.

Several arrays are shown. Each array includes data transducers 1504, servo transducers 1506, and supplemental servo readers 1505. The transducers are logically divisible into two sub-arrays sandwiching a centerline 1508 of the respective array. Moreover, the supplemental servo readers 1505 are positioned in spare areas of the arrays illustrated.

As shown, the arrays include an eight channel array 1502. The eight channel array 1502 is asymmetrical about the centerline 1508. Moreover, supplemental servo reader 1505 is positioned at a center of the array 1502, which is offset from the centerline 1508.

A 16 channel array 1510 is backward compatible with the eight channel array 1502. The 16 channel array 1510 is symmetrical about the centerline 1508.

A 32 channel array 1512 is backward compatible with the 16 channel array 1510 and the eight channel array 1502. The 32 channel array 1512 is symmetrical about the centerline 1508. An inactive area is located near the centerline 1508. Thus, this array 1514 is configured to provide a spare area along the centerline 1508.

A 64 channel array 1514 is backward compatible with the 32 channel array 1512, the 16 channel array 1510 and the eight channel array 1502. The 64 channel array 1512 is symmetrical about the centerline 1508. This array 1514 is configured to provide a spare area along the centerline 1508. It should further be noted that the supplemental servo readers 1505 for each of the 16 channel array 1510, the 32 channel array 1512 and the 64 channel array 1514 are centered relative to the servo transducers 1506 at the centerline 1508.

An alternate 64 channel array 1516 is backward compatible with the 32 channel array 1512, the 16 channel array 1510 and the eight channel array 1502. This array 1516 is configured to provide a spare area along the centerline 1508, as well as spare areas between the servo transducers 1506 and the data transducers 1504 closest thereto. Unlike the asymmetrical array 1502, the array in this embodiment is symmetrical and thus does not require multiplexing during operation, as would be required for asymmetrical arrays. Furthermore, a supplemental servo reader 1505 is positioned on either end of the alternate 64 channel array 1516. Although the supplemental servo readers 1505 of the alternate 64 channel array 1516 are positioned adjacent the servo transducers 1506, it should be noted that the supplemental servo readers 1505 are separated from the servo transducers 1506 in the cross track direction.

Figure 16:
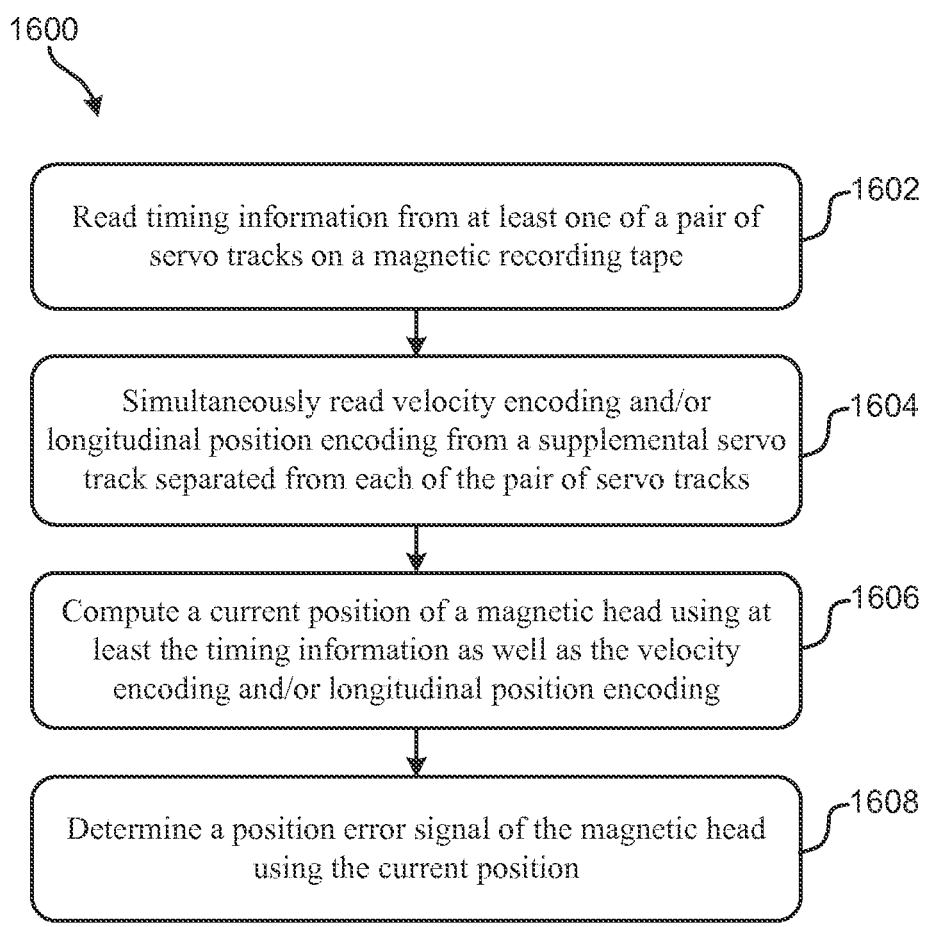
FIG. 16 is a flowchart of a method according to one embodiment.

Now referring to FIG. 16, a flowchart of a method 1600 is shown according to one embodiment. The method 1600 may be performed in accordance with the present invention in any of the environments depicted in FIGS. 1-15, among others, in various embodiments for determining a position error signal of a given magnetic head. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a controller e.g. computer, processor, switch, router, processing circuit, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 16, method 1600 initiates with operation 1602 which includes reading timing information from at least one of a pair of servo tracks on a magnetic recording tape, e.g., such as servo tracks 803 of FIG. 8. Moreover, operation 1604 includes simultaneously reading velocity encoding and/or longitudinal position encoding from a supplemental servo track positioned in a spare area of the magnetic recording tape and separated from each of the pair of servo tracks.

Referring still to FIG. 16, operation 1606 includes computing a current position of a magnetic head using at least the timing information as well as the velocity encoding and/or longitudinal position encoding, e.g., using processes known in the art. Finally, operation 1608 of method 1600 includes determining a position error signal of the magnetic head using the current position computed in operation 1606. Further actions may be taken upon determining a position error signal, which may include but are in no way limited to, storing corresponding information in memory (e.g., a lookup table), performing additional calculations, etc.

The position error signal may be used in various embodiments to determine tape skew corresponding to a given magnetic head. For example, it may be determined that a given tape head is experiencing tape skew when the position error signal of a magnetic head exceeds a threshold value (e.g., which may be predetermined). Furthermore, a tape skew actuator may be implemented to compensate for any such determined tape skew depending on the desired embodiment.

In operation an apparatus may concurrently read both the timing information encoded in the chevron pattern of servo tracks and the velocity and/or longitudinal information encoded in one or more supplemental servo track. As alluded to above, servo reader redundancy may be provided by deploying, for example, centrally located servos in more than one module for reading and writing functions, thereby enabling read-while-write functionality. Moreover, according to one approach, while writing, a primary supplemental servo of a module may become inoperable due to media or other defects. As a result, computer program product, firmware, etc. may switch to using a different supplemental servo reader, e.g., of a different module, thereby retaining functionality despite a supplemental servo failure. Depending on the desired embodiment, the reader module servo may be used until the primary servo recovers, until another failure occurs, etc.

An apparatus according to one embodiment includes a magnetic head having an array of transducers including data and servo transducers, where the apparatus is configured to read and/or write to a magnetic recording tape according to a format. The format specifies a number of active channels symmetrically arranged about a center of the array which correspond to the transducer locations being symmetrical about the centerline 1508 of the array, locations of data tracks on the magnetic recording tape, and spare areas on the magnetic recording tape. The format also specifies backward compatibility with a second format. The second format specifies a smaller number of active channels than the number of active channels specified by the format.

It will be clear that the various features of the foregoing systems and/or methodologies may be combined in any way, creating a plurality of combinations from the descriptions presented above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
   a magnetic recording tape having:
      at least one first servo track having timing information, and
      a supplemental servo track having at least one of: velocity encoding and longitudinal position encoding,
         wherein the supplemental servo track is positioned in a spare area located within a data band of the magnetic recording tape.

2. A product as recited in claim 1, wherein the at least one first servo track does not include velocity encoding or longitudinal position encoding.

3. A product as recited in claim 1, wherein the supplemental servo track includes timing encoding.

4. A product as recited in claim 1, wherein the spare area is centered relative to an adjacent pair of first servo tracks that define the data band.

5. A product as recited in claim 1, wherein the spare area of a data band is offset from a center relative to an adjacent pair of first servo tracks that define the data band.

6. A product as recited in claim 1, wherein the spare area is contiguous.

7. A product as recited in claim 1, wherein the spare area is noncontiguous.

8. A product as recited in claim 1, wherein the supplemental servo track contains both velocity encoding and longitudinal position encoding.

9. A product as recited in claim 1, wherein the first servo track is separated from the supplemental servo track.

10. An apparatus, comprising:
    a magnetic head; and
    at least one module having an array of transducers,
       wherein the apparatus is configured to read and/or write to magnetic recording media having:
          at least one first servo track having timing information, and
          a supplemental servo track having at least one of: velocity encoding and longitudinal position encoding,
             wherein the supplemental servo track is positioned in a spare area located within a data band of the magnetic recording media.

11. An apparatus as recited in claim 10, wherein the at least one first servo track does not include velocity encoding or longitudinal position encoding.

12. An apparatus as recited in claim 10, wherein the spare area is centered relative to the array of transducers.

13. An apparatus as recited in claim 10, wherein the spare area is offset from a center relative to the array of transducers.

14. An apparatus as recited in claim 10, wherein the supplemental servo track contains both velocity encoding and longitudinal position encoding.

15. An apparatus as recited in claim 10, comprising a second module having a second array of transducers, wherein the second array of transducers includes a servo reader for reading the supplemental servo track.

16. An apparatus as recited in claim 10, further comprising:
    a drive mechanism for passing magnetic recording media over the magnetic head; and
    a controller electrically coupled to the magnetic head.

17. A computer program product for determining a position error signal, the computer program product comprising a computer readable storage medium having program instructions embodied therewith, the program instructions readable and/or executable by a hardware-based controller to cause the controller to:
    read, by the controller, timing information from at least one of a pair of servo tracks on a magnetic recording tape;
    simultaneously read, by the controller, velocity encoding and/or longitudinal position encoding from a supplemental servo track separated from each of the pair of servo tracks;
    compute, by the controller, a current position of a magnetic head using at least the timing information as well as the velocity encoding and/or longitudinal position encoding; and
    determine, by the controller, a position error signal of the magnetic head using the current position,
    wherein the supplemental servo track is positioned in a spare area located within a data band of the magnetic recording tape.

* * * * *